United States Patent
Zhong et al.

(10) Patent No.: US 11,586,201 B2
(45) Date of Patent: Feb. 21, 2023

(54) METHOD AND APPARATUS FOR RECOGNIZING A STUCK STATUS AS WELL AS COMPUTER STORAGE MEDIUM

(71) Applicant: ShenZhen Silver Star Intelligent Technology CO., LTD, Guangdong (CN)

(72) Inventors: Minghong Zhong, Shenzhen (CN); Lirong Ye, Shenzhen (CN); Ruijun Yan, Shenzhen (CN)

(73) Assignee: ShenZhen Silver Star Intelligent Technology CO.. LTD, Guangdong (CN)

( * ) Notice: Subject to any disclaimer, the term of this patent is extended or adjusted under 35 U.S.C. 154(b) by 222 days.

(21) Appl. No.: 17/005,433

(22) Filed: Aug. 28, 2020

(65) Prior Publication Data

US 2021/0263514 A1    Aug. 26, 2021

(30) Foreign Application Priority Data

Feb. 26, 2020 (CN) .......................... 202010119826.5

(51) Int. Cl.
| G05D 1/00 | (2006.01) |
| G01C 21/00 | (2006.01) |
| G05D 1/02 | (2020.01) |

(52) U.S. Cl.
CPC ....... *G05D 1/0055* (2013.01); *G01C 21/3807* (2020.08); *G05D 1/027* (2013.01);
(Continued)

(58) Field of Classification Search
CPC .... G05D 1/0055; G05D 1/0212; G05D 1/027; G05D 1/0272; G05D 2201/0203;
(Continued)

(56) References Cited

U.S. PATENT DOCUMENTS

| 2015/0150429 A1* | 6/2015 | Yoo ..................... A47L 11/4011 173/4 |
| 2017/0153646 A1* | 6/2017 | Shin ..................... G05D 1/0272 |

(Continued)

FOREIGN PATENT DOCUMENTS

| CN | 106403998 A | 2/2017 |
| CN | 106840177 A | 6/2017 |

(Continued)

OTHER PUBLICATIONS

1st search of priority document for Chinese application 2020101198265, filed Feb. 26, 2020.

(Continued)

*Primary Examiner* — Jess Whittington
*Assistant Examiner* — Brian E Yang
(74) *Attorney, Agent, or Firm* — Fielt Intellectual Property Law; Paul D. Bianco; Gary S. Winer

(57) ABSTRACT

The present disclosure proposes a method and an apparatus for recognizing a stuck status as well as a computer storage medium, with the method comprising: building an environmental map within a preset extent by taking the current position of the mobile robot as center; real-time monitoring the march information of the mobile robot and predicting whether the mobile robot is stuck or not; acquiring data from multiple sensors of the mobile robot, if the mobile robot is stuck; and recognizing the current stuck status of the mobile robot based on the data from multiple sensors.

13 Claims, 3 Drawing Sheets

(52) U.S. Cl.
 CPC ......... *G05D 1/0212* (2013.01); *G05D 1/0272* (2013.01); *G05D 2201/0203* (2013.01)

(58) Field of Classification Search
 CPC .............. G05D 1/0214; G01C 21/3807; G01C 21/1652; G01C 21/1656; G01C 21/206; G01C 21/165; G01C 23/00; A47L 11/24; G08C 17/02
 See application file for complete search history.

(56) References Cited

U.S. PATENT DOCUMENTS

| | | | | |
|---|---|---|---|---|
| 2020/0004260 | A1* | 1/2020 | Kim | G05D 1/0246 |
| 2020/0019181 | A1* | 1/2020 | Kim | G05D 1/0238 |

FOREIGN PATENT DOCUMENTS

| | | | |
|---|---|---|---|
| CN | 108427411 | A | 8/2018 |
| CN | 108693880 | A | 10/2018 |
| CN | 108814422 | A | 11/2018 |
| CN | 109394086 | A | 1/2019 |
| CN | 109606354 | A | 4/2019 |
| CN | 109864666 | A | 6/2019 |
| CN | 109875470 | A | 6/2019 |
| CN | 110448241 | A | 11/2019 |
| JP | 2012042285 | A | 3/2012 |

OTHER PUBLICATIONS

Supplemental Search Report issued for Chinese application 2020101198265, filed Feb. 26, 2020.
2nd Supplemental Search Report issued for Chinese application 2020101198265, filed Feb. 26, 2020.
1st Office action for Chinese application 202010119826.5, dated May 12, 2021.
2nd Office action for Chinese application 202010119826.5, dated Sep. 15, 2021.
3rd Office action for Chinese application 202010119826.5, dated Dec. 28, 2021.
1th Office action for Chinese application 202010119826.5, dated Feb. 25, 2022.

* cited by examiner

METHOD AND APPARATUS FOR RECOGNIZING A STUCK STATUS AS WELL AS COMPUTER STORAGE MEDIUM

CROSS-REFERENCE TO RELATED APPLICATION

This application claims priority to Chinese Patent Application No. 2020101198265, filed with the Chinese Patent Office on Feb. 26, 2020, entitled "Method and Apparatus for Recognizing a Stuck Status as well as Computer Storage Medium", which is incorporated herein by reference in its entirety.

TECHNICAL FIELD

The present disclosure relates to the field of robotics, and particularly to a method and an apparatus for recognizing a stuck status as well as a computer storage medium.

BACKGROUND

In the 21st century, artificial intelligence products are getting more and more attention, including floor mopping robots, which are mainly used to help human clean indoor ground environment. Therefore, the environment in which a floor mopping robot works includes the home environment; the floor mopping robot marches in a complex home environment by utilizing a navigation system and various sensors, while the floor mopping robot may encounter, e.g., slopes and table legs, causing the floor mopping robot to be stuck. However, current floor mopping robots cannot recognize the type of the stuck status currently encountered by the floor mopping robots, which may cause that the floor mopping robots execute incorrect extrication actions, rendering that the floor mopping robots require longer time for executing an effective extrication action, and accordingly affecting the working efficiency of the floor mopping robots. Therefore, existing floor mopping robots need to be improved.

SUMMARY

In a first aspect of the present disclosure, a method for recognizing a stuck status is proposed, which comprises: building an environmental map within a preset extent by taking the current position of the mobile robot as center; real-time monitoring the march information of the mobile robot and according to the position-pose information of the mobile robot in the environmental map predicting whether the mobile robot is stuck or not, wherein the march information contains the position-pose information of the mobile robot in the environmental map; acquiring data from multiple sensors of the mobile robot, if the mobile robot is stuck; and recognizing the current stuck status of the mobile robot based on the data from multiple sensors.

A second aspect of the present disclosure proposes an apparatus for recognizing a stuck status, comprising a controller and an inertial measurement unit, wherein the inertial measurement unit is configured to acquire the march information of the mobile robot and transmit the same to the controller; and the controller is at least configured to monitor the march information of the mobile robot, to judge whether the mobile robot is stuck based on data from multiple sensors and to recognize the type of the stuck status.

A third aspect of the present disclosure further proposes a computer storage medium, which comprises a processor and a memory that are in communication connection with each other, wherein several instructions are stored in the memory, and the processor realizes the method for recognizing a stuck status according to any one of the above embodiments by executing the several instructions.

DETAILED DESCRIPTION OF THE EMBODIMENTS

Figure 1:
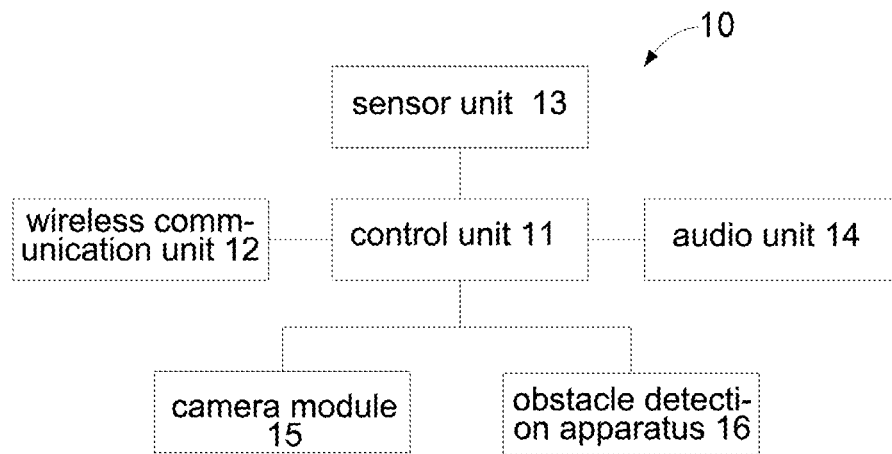
FIG. 1 shows a schematic diagram of component of a mobile robot provided in an embodiment of the present disclosure.

In order to make the technical problems solved by the present disclosure, the technical solutions and the beneficial effects clearer, the present disclosure will be further described in detail below with reference to the drawings and the embodiments. It should be understood that specific embodiments described herein are merely used to explain the present disclosure and are not intended to define the present disclosure.

The embodiments of the present disclosure will be described in detail below, and examples of the embodiments are shown in the drawings, wherein same or similar reference signs represent same or similar elements or elements having same or similar functions throughout the context. The embodiments described below with reference to the drawings are exemplary and are intended to explain the present disclosure, thus should not be construed as limiting the present disclosure.

In the description of the present disclosure, it should be understood that orientation or position relationships indicated by terms, such as "transverse", "length", "width", "upper", "lower", "front", "rear", "left", "right", "vertical", "horizontal", "top", "bottom", "clockwise", and "anticlockwise", are orientation or position relationships shown based on the drawings, merely for facilitating the description of the present disclosure and for simplifying the description, rather than indicating or implying that the specified apparatus or element must be in a specific orientation, or be constructed or operated in a certain orientation, and therefore cannot be construed as limiting the present disclosure.

In addition, terms such as "first" and "second" are used merely for purpose of description, and cannot be construed as indicating or implying to have importance in relativity, or implicitly suggesting the number of the indicated technical features. Therefore, a feature defined with a term "first" or "second" could be construed in such a way that at least one of the features is included explicitly or implicitly. In the description of the present disclosure, the meaning of the term "multiple" indicates at least two, e.g. two or more, unless otherwise expressly defined.

In the present disclosure, unless otherwise expressly specified and defined, terms such as "mount", "connect", "connection", and "fix" shall be construed in a broad sense. For example, it may be fixed connection, or detachable connection, or integrated connection; it may be mechanical connection, or electrical connection; it may be direct connection, or indirect connection via an intermediate medium, or inner communication between two elements or interactive relationship between two elements, unless otherwise expressly defined. For a person ordinarily skilled in the art, the specific meanings of the above-mentioned terms in the present disclosure could be construed in accordance with specific circumstances.

In the present disclosure, unless otherwise expressly specified and defined, the expression that a first feature is "on" or "under" a second feature could be construed in such a way that the first feature and the second feature are in direct contact, or the first feature and the second feature are in indirect contact through an intermediate medium. Moreover, the expression that a first feature is "over", "above", or "on" a second feature could be construed in such a way that the first feature is right or obliquely above the second feature, or merely indicates that the first feature is higher in level than the second feature. The expression that a first feature is "below", "underneath", or "beneath" a second feature could be construed in such a way that the first feature is right or obliquely below the second feature, or merely indicates that the first feature is lower in level than the second feature.

The present disclosure solves one of the above technical problems at least to a certain degree, and the present disclosure provides a method and an apparatus for recognizing a stuck status that can rapidly recognize the type of stuck status and improve the efficiency of executing extrication of a mobile robot, as well as a computer storage medium.

In a first aspect of the present disclosure, a method for recognizing a stuck status of a mobile robot is proposed, which comprises: building an environmental map within a preset extent by taking the current position of the mobile robot as center;

real-time monitoring the march information of the mobile robot and according to the position-pose information of the mobile robot in the environmental map predicting whether the mobile robot is stuck or not;

acquiring data from multiple sensors of the mobile robot, if the mobile robot is stuck, wherein the march information contains the position-pose information of the mobile robot in the environmental map; and recognizing the current stuck status of the mobile robot based on the data from multiple sensors.

Further, the position-pose information of the mobile robot in the environmental map contains the current position-pose information of the mobile robot and the position-pose information of a previous node, wherein the real-time monitoring the march information of the mobile robot and according to the position-pose information of the mobile robot in the environmental map predicting whether the mobile robot is stuck or not comprises:

acquiring the current position-pose information of the mobile robot and its position-pose information at the previous node, and judging whether the current position-pose information is updated with respect to the position-pose information at the previous node; and if yes, acquiring the target path generated by the mobile robot at the previous node, wherein the march information contains march trajectory, and judging, according to the march trajectory, whether the mobile robot deviates from the target path.

Further, the real-time monitoring the march information of the mobile robot and according to the position-pose information of the mobile robot in the environmental map predicting whether the mobile robot is stuck or not comprises:

acquiring the deviation time, in case that the mobile robot deviates from the target path; and predicting that the mobile robot is stuck, if the deviation time exceeds a first time threshold.

Further, the data from multiple sensors contains current angle information of the mobile robot, wherein the recognizing the current stuck status of the mobile robot based on the data from multiple sensors comprises:

ascertaining an abnormal angle parameter in the current angle information of the mobile robot according to a desired angle, wherein the data from multiple sensors contains current angle information of the mobile robot, and the angle information contains a course angle, a roll angle, and a pitch angle.

Further, the data from multiple sensors contains dual main wheel coding values, wherein the recognizing the current stuck status of the mobile robot based on the data from multiple sensors comprises:

judging whether the dual main wheel coding values are normal or abnormal, when the course angle deviates from the desired angle by a first angle threshold;

determining that the mobile robot is in a first type of stuck status, if the dual main wheel coding values are normal; and determining that the main wheel with an abnormal coding value breaks down, and the mobile robot is in a second type of stuck status, if at least one of the dual main wheel coding values is abnormal.

Further, the mobile robot is controlled to execute a first extrication action, if the mobile robot is determined as being in a first type of stuck status; the mobile robot is controlled to execute a second extrication action, if the mobile robot is determined as being in a second type of stuck status.

Further, the recognizing the current stuck status of the mobile robot based on the data from multiple sensors comprises:

acquiring the time of abnormal data of a pitch angle or a roll angle and the ground detection strength information, if the pitch angle or the roll angle exceeds a second angle threshold; and determining that the mobile robot is in a third type of stuck status, if the I time of abnormal data exceeds a second time threshold and the ground detection strength information is attenuated gradually.

Further, the mobile robot is controlled to execute a third extrication action, if the mobile robot is determined as being in a third type of stuck status.

Further, the recognizing the current stuck status of the mobile robot based on the data from multiple sensors comprises:

judging whether the abnormal time respectively for the course angle, the roll angle and the pitch angle reaches a third time threshold, if the three, i.e. the course angle, the roll angle, and the pitch angle, are all smaller than a desired value, and the course angle, the roll angle, and the pitch angle all fluctuate within a preset range; and if yes, determining that the mobile robot is in a fourth type of stuck status.

Further, the mobile robot is controlled to execute a forth extrication action, if the mobile robot is determined as being in a forth type of stuck status.

A second aspect of the present disclosure proposes an apparatus for recognizing a stuck status, comprising a controller and an inertial measurement unit, wherein the inertial measurement unit is configured to acquire the march information of the mobile robot and transmit the same to the controller; and the controller is at least configured to monitor the march information of the mobile robot, to judge whether the mobile robot is stuck based on data from multiple sensors and to recognize the type of the stuck status.

In some embodiments, the data from multiple sensors contains current angle information of the mobile robot, the controller ascertains an abnormal angle parameter in the angle information according to a desired angle, and the angle information contains a course angle, a roll angle, and a pitch angle.

In some embodiments, the apparatus for recognizing a stuck status comprises a main wheel code disk unit and a ground detection sensor; wherein the main wheel code disk unit is configured to acquire main wheel code disk data of the mobile robot and transmit the same to the controller; and the ground detection sensor is configured to acquire information about light reflection strength on the ground and transmit the same to the controller.

In some embodiments, the data from multiple sensors contains dual main wheel coding values, the controller is configured in such a way that: the controller detects whether dual main wheel coding values are normal or abnormal, when the course angle deviates from the desired angle by a first angle threshold;

the mobile robot is determined as being in a first type of stuck status, if the dual main wheel coding values are normal; and it is determined that the main wheel with an abnormal coding value breaks down and the mobile is in a second type of stuck status, if at least one of the dual main wheel coding values is abnormal.

In some embodiments, the controller is used for controlling the mobile robot to execute a first extrication action, if the mobile robot is determined as being in a first type of stuck status; the controller is also used for controlling the mobile robot to execute a second extrication action, if the mobile robot is determined as being in a second type of stuck status.

In some embodiments, the controller is configured in such a way that: the controller acquires the time of abnormal data of a pitch angle or a roll angle and the ground detection strength information, when the pitch angle or the roll angle exceeds a second angle threshold; and the mobile robot is determined as being in a third type of stuck status, if the time of abnormal data of the pitch angle and/or the roll angle exceeds a second time threshold and the ground detection strength information is attenuated gradually.

In some embodiments, the controller is also used for controlling the mobile robot to execute a third extrication action, if the mobile robot is determined as being in a third type of stuck status.

In some embodiments, the controller is configured in such a way that: when the course angle, the roll angle, and the pitch angle received by the controller are all smaller than a desired value, and the course angle, the roll angle, and the pitch angle all fluctuate within a preset range, the controller acquires the abnormal time of the three, i.e. the course angle, the roll angle, and the pitch angle, and mobile robot is determined as being in a forth type of stuck status, in case that the abnormal time reaches a third time threshold.

In some embodiments, the controller is also used for controlling the mobile robot to execute a forth extrication action, if the mobile robot is determined as being in a forth type of stuck status.

A third aspect of the present disclosure further proposes a computer storage medium, which comprises a processor and a memory that are in communication connection with each other, wherein several instructions are stored in the memory, and the processor realizes the method for recognizing a stuck status according to any one of the above embodiments by executing the several instructions.

In comparison with the prior art, the present disclosure has at least the following beneficial effects:

The present disclosure proposes a method for recognizing a stuck status of a mobile robot, the method comprising: building an environmental map within a preset extent by taking the current position of the mobile robot as center; real-time monitoring the march information of the mobile robot and according to the position-pose information of the mobile robot in the environmental map predicting whether the mobile robot is stuck or not; acquiring data from multiple sensors of the mobile robot, if the mobile robot is stuck, wherein the march information contains the position-pose information of the mobile robot in the environmental map; and recognizing the current stuck status of the mobile robot based on the data from multiple sensors. In the present disclosure, the type of stuck status of the mobile robot is accurately recognized according to the sensor data by real-time monitoring the march information of the mobile robot and acquiring data from multiple sensors of the mobile robot, hereby enabling the mobile robot to execute a more efficient extrication action according to the specific type of stuck status; and with respect to the lack of a targeted extrication action in a conventional floor mopping robot, the extrication time is efficiently shortened, and the extrication efficiency of the mobile robot is improved.

A mobile robot provided in an embodiment of the present disclosure may be constructed in any suitable form, wherein the mobile robot may be a cleaning mobile robot, a mowing mobile robot, a security patrol mobile robot, a service mobile robot or the like.

Referring to FIG. 1, an embodiment of the present disclosure provides a mobile robot 10, and the mobile robot 10 as mentioned above comprises a control unit 11, a wireless communication unit 12, a sensor unit 13, an audio unit 14, a camera module 15, and an obstacle detection apparatus 16.

As control core of the mobile robot 10, the control unit 11 coordinates the work of each unit. The control unit 11 may be a general-purpose processor (e.g. a central processing unit, CPU), a digital signal processor (DSP), an application specific integrated circuit (ASIC), a field-programmable gate array (FPGA, CPLD etc.), a single chip microcomputer, an ARM (Acorn RISC Machine) or other programmable logic devices, a discrete gate or a transistor logic, a discrete hardware component, or any combination of these components. Furthermore, the control unit 11 may further be any conventional processor, controller, microcontroller or state machine. The control unit 11 may also be implemented as a combination of computing devices, for example, a combination of a DSP and a microprocessor, multiple microprocessors, one or more microprocessors combined with a DSP core, or any other such configuration.

The wireless communication unit 12 is used for wireless communication with a user terminal, and the wireless communication unit 12 is in electrical connection with the control unit 11. A user sends a control instruction to the mobile robot 10 via the user terminal, the wireless communication unit 12 receives the control instruction and sends this control instruction to the control unit 11, which then controls the mobile robot 10 according to this control instruction.

The wireless communication unit 12 includes one, or a combination of more, of a broadcast receiving module, a mobile communication module, a wireless Internet module, a short-range communication module, and a positioning information module. Herein, the broadcast receiving module receives a broadcast signal and/or broadcast-related information from an external broadcast management server via a broadcast channel. The broadcast receiving module can receive a digital broadcast signal by using a digital broadcasting system, which may for example be terrestrial digital multimedia broadcasting (DMB-T), satellite digital multimedia broadcasting (DMB-S), media-only forward link (MediaFLO), handheld digital video broadcasting (DVB-H) or terrestrial integrated service digital broadcasting (ISDB-T).

The mobile communication module sends a wireless signal to at least one of a base station, an external terminal, and a server in a mobile communication network, or can receive a wireless signal from at least one of the base station, the external terminal, and the server. Herein, according to the reception and sending of character/multimedia messages, the wireless signal may contain a voice call signal, a video call signal, or data in various forms.

The wireless Internet module refers to a module for wireless Internet connection, and may be built-in or external to the terminal. Wireless Internet technologies such as wireless LAN (WLAN) (Wi-Fi), wireless broadband (Wi-bro), world interoperability for microwave access (Wimax), and high speed downlink packet access (HSDPA) can be used.

The short-range communication module refers to a module for short-range communication. Short-range communication technologies such as Bluetooth, radio frequency identification (RFID), infrared data association (IrDA), ultra-wideband (UWB), or ZigBee can be used.

The positioning information module is configured to acquire the current position information of the mobile robot 10, for example, a global positioning system (GPS) module.

The audio unit 14 is configured to control the mobile robot 10 to stop working and to send an alarm signal of liftoff, when the position status information refers to a lifted state. The audio unit 14 is in electrical connection with the control unit 11.

In some embodiments, the audio unit 14 may be an electroacoustic transducer such as a trumpet, a loudspeaker, a microphone etc., wherein there may be one or more trumpets or loudspeakers, and there may be a plurality of microphones that may constitute a microphone array, so as to effectively collect sound. Microphones may be an electrodynamic microphone (of a moving coil type, a belt type), a capacitive (DC-polarized) microphone, a piezoelectric microphone (of a transistor type, ceramic type), an electromagnetic microphone, a carbon grain microphone, a semiconductor microphone and the like, or any combination thereof. In some embodiments, the microphone may be a micro-electromechanical system (MEMS) microphone.

The camera module 15 is configured to photograph the environment where the mobile robot 10 is located; the camera module 15 is in electrical connection with the control unit 11; and the camera module 15 acquires an image of the environment where the mobile robot 10 is located and outputs the image to the control unit 11, such that the control unit 11 performs next logical operation based on the image.

The obstacle detection apparatus 16 is configured to detect walls and obstacles, and to transmit detection signals to the walls and the obstacles in real time; and in the present embodiment, the obstacle detection apparatus is a light sensor, including but not limited to an infrared sensor.

The present disclosure will be further described below with reference to the drawings and the embodiments.

Figure 2:
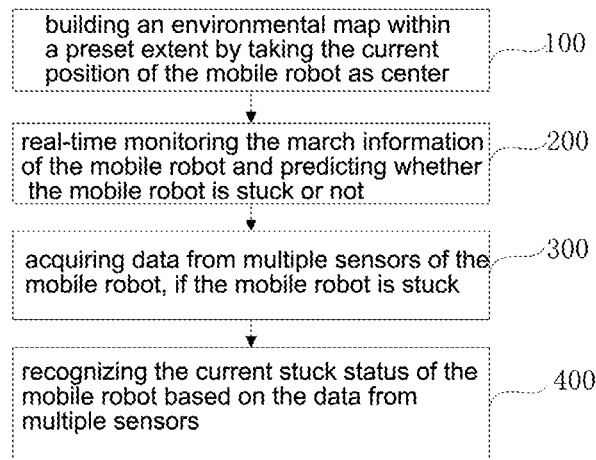
FIG. 2 shows a schematic flow diagram for recognizing a stuck status provided in an embodiment of the present disclosure.

As shown in FIG. 2, a first aspect of the present disclosure proposes a method for recognizing a stuck status of a mobile robot, comprising:

Step 100: building an environmental map within a preset extent by taking the current position of the mobile robot 10 as center;

Step 200: real-time monitoring the march information of the mobile robot 10 and predicting whether the mobile robot 10 is stuck or not;

Step 300: acquiring data from multiple sensors of the mobile robot 10, if the mobile robot 10 is stuck; and Step 400: recognizing the current stuck status of the mobile robot 10 based on the data from multiple sensors.

In the present disclosure, by real-time monitoring the march information of the mobile robot 10 and acquiring data from multiple sensors of the mobile robot 10, the type of the stuck status of the mobile robot 10 is accurately recognized according to the sensor data, wherein the multiple sensors comprise: a ground detection sensor, an inertial measurement unit, and a wall detection sensor, wherein the ground detection sensor performs cliff detection mainly utilizing an infrared light-emitting diode for the detection of the mobile robot 10, hereby avoiding the falling of the mobile robot 10. The inertial measurement unit is configured to measure the acceleration and the angular velocity of the mobile robot 10 in a triaxial direction, and record the position and pose changes of the mobile robot 10 over a period of time; and the wall detection sensor controls the mobile robot 10 to perform cleaning work along the wall or away from the wall by transmitting an infrared signal. In case that data of one or more sensors of the mobile robot 10 are abnormal, the mobile robot 10 performs analysis regarding the sensor with the abnormal data, accordingly ascertains the essential reason for the data abnormality, hereby ascertaining the type of the stuck status of the mobile robot 10. The mobile robot 10 is enabled to execute a more efficient extrication action aiming at the specific type of stuck status; and with respect to the lack of a targeted extrication action in a conventional floor mopping robot, the extrication time is efficiently shortened, and the extrication efficiency of the mobile robot 10 is improved.

Herein, the building an environmental map within a preset extent by taking the current position of the mobile robot 10 as center refers to the creation of a fine map within a unit extent of 4*4; in case that the mobile robot 10 does not leave the fine map within a period of time, the mobile robot 10 is potentially stuck, and the creation of the environmental map within a preset extent aims at preliminarily judging whether the mobile robot is stuck or not and providing basic information for subsequent fine judgment of the type of the stuck status.

Figure 6:
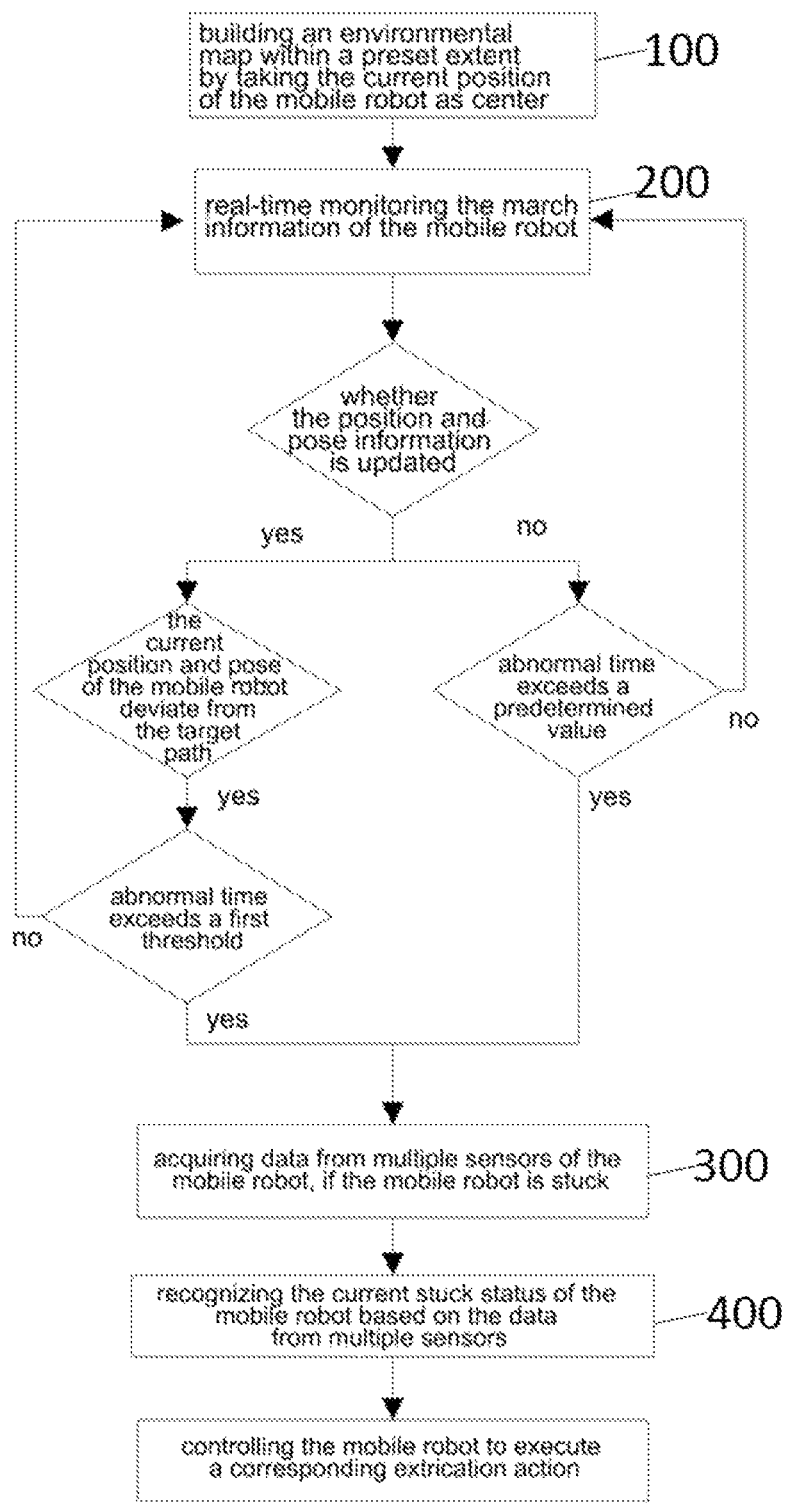
FIG. 6 shows another schematic flow diagram for recognizing a stuck status provided in an embodiment of the present disclosure.

Further, referring to FIG. 6, the real-time monitoring the march information of the mobile robot 10 and predicting whether the mobile robot is stuck or not comprises:

acquiring the current position-pose information of the mobile robot 10 and its position-pose information at the previous node, and judging whether the current position-pose information is updated with respect to the position-pose information at the previous node, specifically, judging whether the position of the mobile robot 10 is changed over a period of time, wherein the position information of the mobile robot 10 would not change greatly or even would not change at all, if the mobile robot 10 is stuck. Detecting whether the position-pose information of the mobile robot is updated serves as a basic condition for judging whether the mobile robot 10 is stuck, and further judgment is to be made on this basis. The stuck status comprises at least the following situations: 1) the mobile robot 10 deviates from the original target path because of the slipping of one of the two driving wheels; 2) the mobile robot 10 climbs a slope and is stuck on the slope because of an underpowered driving wheel; and 3) the mobile robot 10 encounters an obstacle when marching on the ground, which has a height lower than the driving wheels and is relatively smooth (e.g. a metal rod), causing that the mobile robot 10 cannot cross the obstacle.

Referring to FIG. 6, if the current position-pose information is not updated with respect to the position-pose information at the previous node, the abnormal time of the mobile robot 10 is acquired, wherein it jumps to step 300 when the abnormal time reaches a predetermined value, where detailed analysis regarding the stuck status is performed to recognize the specific stuck status; while it jumps to step 200 if the abnormal time does not reach the predetermined value, where the monitoring of the real-time march information of the mobile robot 10 is continued.

Referring to FIG. 6 again, if the current position-pose information is updated with respect to the position-pose information at the previous node, the target path generated by the mobile robot 10 at the previous node is acquired, wherein the march information contains march trajectory, and it is judged according to the march trajectory whether the mobile robot 10 deviates from the target path.

The target path generated by the mobile robot 10 at the previous node is acquired, wherein the march information contains march trajectory, and it is judged according to the march trajectory whether the mobile robot 10 deviates from the target path. Specifically, the mobile robot 10 generates a target path at the previous node, that is, at the previous position; if the path practically travelled deviates from the target path, it is to be judged specifically whether practical moving direction, motion trail tendency, march trajectory, and course angle of the mobile robot 10 deviate from corresponding reference data in the target path, and if they deviate from the reference data, next judgment is to be made.

In case that the mobile robot 10 deviates from the target path, the deviation time is to be acquired; and if the deviation time exceeds a first time threshold, it is determined that the mobile robot 10 is stuck; otherwise, the mobile robot 10 sends an alarm signal and returns to execute step 200, where the monitoring of the march information of the mobile robot 10 is continued.

A first time threshold is set in the solution, and according to the fact whether the time of deviation of the mobile robot 10 from the target path reaches the first time threshold, it is confirmed whether the mobile robot 10 is stuck or breaks down, so as to avoid misjudgments from causing that the mobile robot 10 conducts faulty operations.

Further, the recognizing the current stuck status of the mobile robot 10 based on the data from multiple sensors comprises:

ascertaining an abnormal angle parameter in angle information according to a desired angle, wherein the march information contains current angle information and coordinate information of the mobile robot 10, and the angle information contains a course angle, a roll angle, and a pitch angle.

Further, the recognizing the current stuck status of the mobile robot 10 based on the data from multiple sensors comprises: judging whether dual main wheel coding values are normal or abnormal, when the course angle deviates from the desired angle by a first angle threshold; and determining that the mobile robot is in a first type of stuck status, if the dual main wheel coding values are normal, and specifically, determining that one of the dual main wheels of the mobile robot 10 is idling. At this moment, the mobile robot 10 is controlled to execute a first extrication action, and the first extrication action comprises the following steps:

S101: controlling the mobile robot 10 to rotate in place, until the main direction of the mobile robot 10 is identical with the target path;

S102: controlling the mobile robot 10 to move backwards for a certain distance, if the main direction after rotation still deviates from the target path greatly, and to continue to rotate until the main direction is identical with the target path; and S103: controlling the mobile robot 10 to move to an adjacent cleaning route for cleaning, if the extrication is still unsuccessful.

If at least one of the dual main wheel coding values is abnormal, it is determined that the mobile robot 10 is in a second type of stuck status, and it is accordingly determined that the main wheel with an abnormal coding value breaks down.

Further, the recognizing the current stuck status of the mobile robot 10 based on the data from multiple sensors comprises:

acquiring the abnormal time of data and the ground detection strength information of a pitch angle or a roll angle, if the pitch angle or the roll angle exceeds a second angle threshold; and determining that the mobile robot 10 is in a third type of stuck status, if the abnormal time of data exceeds a second time threshold and the ground detection strength information is attenuated gradually. Specifically, it is determined that at this moment, the mobile robot 10 is stuck on an obstacle, since the mobile robot 10 cannot cross the obstacle. Then, the mobile robot 10 is controlled to execute a third extrication action, and the third extrication action comprises the following steps:

S301: controlling the mobile robot 10 to move backwards for a certain distance;

S302: controlling the mobile robot 10 to rotate in place clockwise by 180°, and then controlling the mobile robot 10 to execute step S304, if the measured rotation angle of the machine is normal at this moment, otherwise to execute step S303;

S303: controlling the mobile robot 10 to rotate in place clockwise by 180°, and then controlling the mobile robot 10 to execute step S304, if the measured rotation angle of the machine is normal at this moment; or sending an error reporting signal, if the measured rotation angle is not normal and it is detected that the extrication duration exceeds an extrication time TO, and jumping to step S301, if the extrication time TO is exceeded; and S304: controlling the mobile robot 10 to move to an adjacent cleaning route for cleaning.

Further, the recognizing the current stuck status of the mobile robot 10 based on the data from multiple sensors comprises:

judging whether the abnormal time respectively for the course angle, the roll angle and the pitch angle reaches a third time threshold, if the three, i.e. the course angle, the roll angle, and the pitch angle, are all smaller than a desired value, and the course angle, the roll angle, and the pitch angle all fluctuate continuously within a preset range; and if yes, determining that the mobile robot 10 is in a fourth type of stuck status, and specifically, determining at this moment that the mobile robot 10 is in a hanged state. Then, the mobile robot 10 is controlled to execute a fourth extrication action, which specifically comprises the following steps:

S401: controlling the mobile robot 10 to move backwards for a certain distance at a low speed;

S402: controlling a first main wheel of the dual main wheels to move backwards for a certain distance at a low speed, and jumping to step S404 in case that the measured rotation angle of the machine is normal at this moment, otherwise jumping to step S403;

S403: controlling a second main wheel of the dual main wheels to move backwards for a certain distance at a low speed, and jumping to step S404 in case that the measured rotation angle of the machine is normal at this moment, otherwise jumping to step S401; and S404: controlling the mobile robot 10 to move to an adjacent cleaning route for cleaning.

Figure 3:
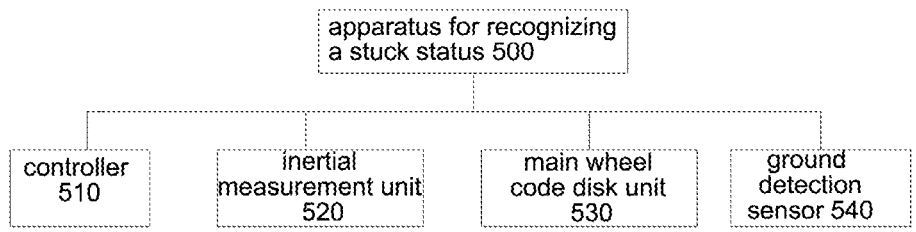
FIG. 3 shows a schematic diagram of component of an apparatus for recognizing a stuck status provided in an embodiment of the present disclosure.
Figure 4:
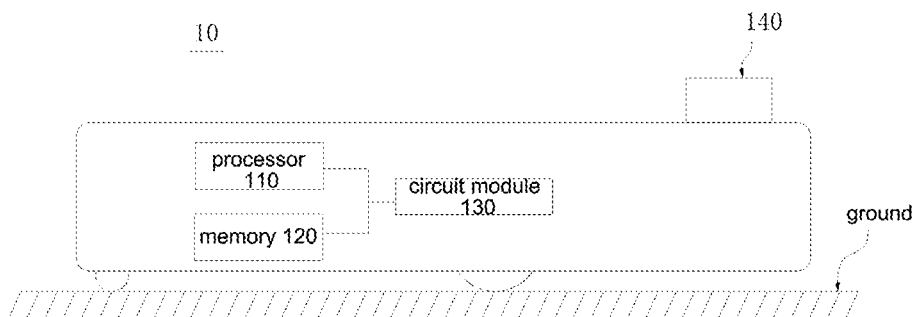
FIG. 4 shows a schematic diagram of a mobile robot provided in an embodiment of the present disclosure.

A second aspect of the present disclosure proposes an apparatus for recognizing a stuck status of a mobile robot, and referring to FIG. 3, the apparatus for recognizing a stuck status 500 comprises a controller 510, an inertial measurement unit 520 configured to acquire the march information of the mobile robot 10 and transmit the same to the controller 510, a main wheel code disk unit 530 configured to acquire main wheel code disk data of the mobile robot 10 and transmit the same to the controller 510, and a ground detection sensor 540 configured to acquire information about light reflection strength on the ground and transmit the same to the controller 510.

The controller 510 is at least configured to monitor the march information of the mobile robot 10, to judge whether the mobile robot 10 is stuck based on data from multiple sensors, and to recognize the type of the stuck status. In the present disclosure, by real-time acquiring data from multiple sensors of the mobile robot 10, the type of the stuck status of the mobile robot 10 is accurately recognized according to the sensor data, wherein the multiple sensors comprise: a ground detection sensor, an inertial measurement unit, and a wall detection sensor, wherein in case of abnormal data of one or more sensors of the mobile robot 10, the mobile robot 10 performs analysis regarding the sensor with abnormal data, and accordingly ascertains the source of the abnormal data, hereby ascertaining the type of the stuck status of the mobile robot 10. The mobile robot 10 is enabled to execute a more efficient extrication action aiming at the specific type of stuck status; and with respect to the lack of a targeted extrication action in a conventional floor mopping robot, the extrication time is efficiently shortened, and the extrication efficiency of the mobile robot 10 is improved.

In some embodiments, the march information contains current angle information and coordinate information of the mobile robot 10, the controller 510 ascertains an abnormal angle parameter in the angle information according to a desired angle, and the angle information contains a course angle, a roll angle, and a pitch angle.

In some embodiments, the controller 510 is configured in such a way that: the controller 510 detects whether dual main wheel coding values are normal or abnormal, when the course angle deviates from the desired angle by a first angle threshold;

if the dual main wheel coding values are normal, the mobile robot 10 is controlled to execute a first extrication action; and the first extrication action comprises the following steps:

S101: controlling the mobile robot 10 to rotate in place, until the main direction of the mobile robot 10 is identical with the target path;

S102: controlling the mobile robot 10 to move backwards for a certain distance, if the main direction after rotation still deviates from the target path greatly, and to continue to rotate until the main direction is identical with the target path; and S103: controlling the mobile robot 10 to move to an adjacent cleaning route for cleaning, if the extrication is still unsuccessful.

If one of the dual main wheel coding values is abnormal, the controller 510 controls the mobile robot 10 to execute a second extrication action.

In some embodiments, the controller 510 is configured in such a way that: the controller 510 acquires the abnormal time of data and the ground detection strength information of a pitch angle or a roll angle, if the pitch angle or the roll angle exceeds a second angle threshold; and if the abnormal time of data exceeds a second time threshold and the ground detection strength information is attenuated gradually, the controller 510 controls the mobile robot 10 to execute a third extrication action. The third extrication action comprises the following steps:

S301: controlling the mobile robot 10 to move backwards for a certain distance;

S302: controlling the mobile robot 10 to rotate in place clockwise by 180°, and then controlling the mobile robot 10 to execute step S304, if the measured rotation angle of the machine is normal at this moment, otherwise to execute step S303;

S303: controlling the mobile robot 10 to rotate in place clockwise by 180°, and then controlling the mobile robot 10 to execute step S304, if the measured rotation angle of the machine is normal at this moment; or sending an error reporting signal, if the measured rotation angle is not normal and it is detected that the extrication duration exceeds an extrication time TO, and jumping to step S301, if the extrication time TO is exceeded; and S304: controlling the mobile robot 10 to move to an adjacent cleaning route for cleaning.

In some embodiments, the controller 510 is configured in such a way that: when the course angle, the roll angle, and the pitch angle received by the controller 510 are all smaller than a desired value, and the course angle, the roll angle, and the pitch angle all fluctuate continuously within a preset range, the controller 510 acquires the abnormal time of the three, i.e. the course angle, the roll angle, and the pitch angle, and the mobile robot 10 is controlled to execute a fourth extrication action in case that the abnormal time reaches a third time threshold, the fourth extrication action specifically comprising the following steps:

S401: controlling the mobile robot 10 to move backwards for a certain distance at a low speed;

S402: controlling a first main wheel of the dual main wheels to move backwards for a certain distance at a low speed, and jumping to step S404 in case that the measured rotation angle of the machine is normal at this moment, otherwise jumping to step S403;

S403: controlling a second main wheel of the dual main wheels to move backwards for a certain distance at a low speed, and jumping to step S404 in case that the measured rotation angle of the machine is normal at this moment, otherwise jumping to step S401; and S404: controlling the mobile robot 10 to move to an adjacent cleaning route for cleaning.

A third aspect of the present disclosure further proposes a computer storage medium, which comprises a processor and a memory that are in communication connection with each other, wherein several instructions are stored in the memory, and the processor realizes the method for recognizing a stuck status according to any one of the above embodiments by executing the several instructions. The computer storage medium may be a circuit chip arranged in a circuit module 130, and the circuit chip can be arranged in the mobile robot 10, such that the mobile robot 10 can implement the above-mentioned method for recognizing a stuck status. The mobile robot 10 is provided with an environment detection apparatus 140, and a laser radar apparatus is specifically adopted.

Figure 5:
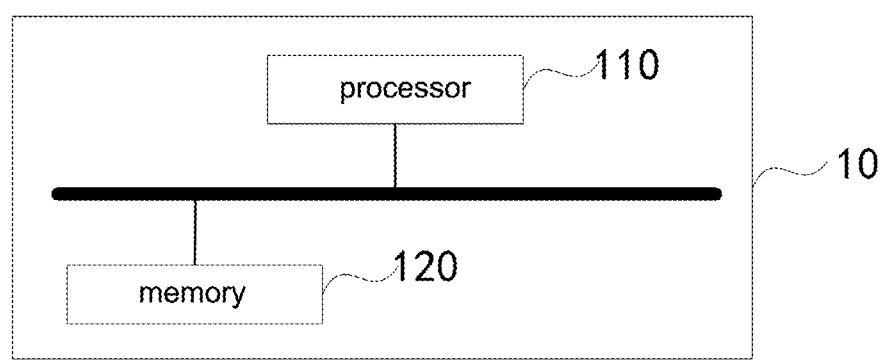
FIG. 5 shows another schematic diagram of a mobile robot provided in an embodiment of the present disclosure.

FIG. 5 shows a structural block diagram of a mobile robot 10 provided in another embodiment of the present disclosure. As shown in FIG. 5, the mobile robot 10 can comprise: a mobile robot body, an obstacle detection apparatus, a control chip 110, a memory 120, and a communication module 130.

The obstacle detection apparatus is arranged on the mobile robot body, and is configured to real-time receive a reflected signal reflected by an obstacle. In the present embodiment, the obstacle detection apparatus is a light sensor, including but not limited to an infrared sensor.

The mobile robot body is provided with a traveling mechanism. The control chip is built in the mobile robot body.

The mobile robot body is a main structure of the mobile robot, and corresponding shape, structure and manufacturing material (e.g. a rigid plastic or a metal such as aluminum or iron) can be selected according to actual requirements of the mobile robot 10, for example, it can be configured as a relatively flat cylinder that is common for a floor mopping mobile robot.

The traveling mechanism is a structural apparatus arranged on the mobile robot body and providing a mobility for the mobile robot 10. This traveling mechanism can be specifically implemented as a mobile device of any type, e.g. with rollers or of crawler type.

The communication connection between any two of the control chip 110, the memory 120, and the communication module 130 is established via a bus.

The control chip 110 may be a control chip 110 of any type and having one or more processing cores. It can perform single-threaded or multi-threaded operations, and be configured to analyze instructions, so as to perform operations of acquiring data, executing the function of logical operation, and issuing operation processing results.

The memory 120 may include an area for storing programs and an area for storing data, wherein the area for storing programs may store an operating system and an application program required for at least one function; and the area for storing data may store data created according to the use of the apparatus for recognizing a stuck status of a mobile robot and the like. In addition, the memory 120 may include a high-speed random access memory, and may also include a non-transient memory, e.g. at least one magnetic disk storage device, a flash memory device, or other non-transient solid-state storage devices. In some embodiments, the memory 120 may optionally include memories remotely provided with respect to the control chip 110, and these remote memories may be in connection with the mobile robot 10 through a network. Examples of the above network include but are not limited to Internet, intranet, local area network, mobile communication network, and combinations thereof.

The memory 120 stores an instruction executable by the at least one control chip 110; the at least one control chip 110 is configured to execute the instruction, so as to implement the method for recognizing a stuck status of a mobile robot in any method embodiment described above.

The communication module 130 is a functional module configured to establish a communication connection and provide a physical channel. The communication module 130 may be a wireless or wired communication module 130 of any type, including but not limited to a WiFi module or a Bluetooth module etc.

Further, an embodiment of the present disclosure also provides a computer storage medium, in which a computer-executable instruction is stored, wherein the computer-executable instruction is executed by one or more control chips 110, e.g. by one control chip 110 in FIG. 5, hereby enabling the one or more control chips 110 as mentioned above to execute the method for recognizing a stuck status of a mobile robot 10 in any method embodiment described above.

The apparatus embodiments as described above are merely schematic, wherein units described as separate components may be or may not be physically separate, components displayed as units may be or may not be physical units, i.e. may be placed at one position, or may be distributed on a plurality of network units. Partial or all modules therein may be selected according to actual requirements to achieve the purpose of the solution of the present embodiment.

Through the description of the above embodiments, a person ordinarily skilled in the art could clearly understand that respective embodiments can be implemented by means of software combined with a general hardware platform, and of course, may also be implemented through hardware. It could be understood for a person ordinarily skilled in the art that all or partial procedures of the method in the above embodiments could be completed by related hardware instructed by a computer program of a computer program product, the computer program can be stored in a non-transient computer-readable storage medium, and this computer program contains a programmed instruction, wherein related equipment can be enabled to execute the procedures of the respective method embodiments as described above, when the programmed instruction is executed by related equipment. Herein, the storage medium may be a magnetic disk, an optical disk, a read-only memory (ROM), a random access memory (RAM) or the like.

The above product can execute the method for recognizing a stuck status of a mobile robot provided in embodiments of the present disclosure, has corresponding functional modules and beneficial effects for executing the method for recognizing a stuck status of a mobile robot. For technical details that are not specifically described in the present embodiment, reference can be made to the method for recognizing a stuck status of a mobile robot provided in the embodiments of the present disclosure.

At last, it is to be clarified that the above embodiments are merely used to explain the technical solutions of the present disclosure, rather than limiting the same; under the idea of the present disclosure, technical features in the above embodiments or in different embodiments may also be combined with each other, steps may be implemented in any order, and many other changes in different aspects of the present disclosure as described above are also possible, which, for conciseness, are not provided in the details; although the present disclosure is explained in detail referring to the preceding embodiments, it should be understood for a person ordinarily skilled in the art that modifications could still be made to the technical solutions recorded in the preceding respective embodiments, or partial technical features therein could be substituted with equivalents; and these modifications or substitutions do not make the essence of the respective technical solutions depart from the scope of the technical solutions of the respective embodiments of the present disclosure.

The invention claimed is:

1. A method for recognizing a stuck status, wherein the method comprises:
    building an environmental map within a preset extent by taking a current position of a mobile robot as center;
    real-time monitoring a march information of the mobile robot and according to a position-pose information of the mobile robot in the environmental map predicting whether the mobile robot is stuck or not, wherein if yes, data from multiple sensors of the mobile robot is acquired, wherein the march information contains the position-pose information of the mobile robot in the environmental map; and
    recognizing a current stuck status of the mobile robot based on the data from multiple sensors,
    wherein the data from multiple sensors contains current angle information of the mobile robot, wherein the recognizing the current stuck status of the mobile robot based on the data from multiple sensors comprises:
    determining an abnormal angle parameter in the current angle information of the mobile robot according to a desired angle,
    wherein the angle information contains a course angle, a roll angle, and a pitch angle,
    wherein the recognizing the current stuck status of the mobile robot based on the data from multiple sensors comprises:
    judging whether an abnormal time for each of the course angle, the roll angle and the pitch angle reaches a third time threshold, if the course angle, the roll angle and the pitch angle are all smaller than a desired value, and the course angle, the roll angle and the pitch angle all fluctuate within a preset range,
    wherein if yes, it is determined that the mobile robot is in a fourth type of stuck status, wherein the method further comprises:
    controlling the mobile robot to execute a fourth extrication action, if the mobile robot is determined as being in the fourth type of stuck status.

2. The method for recognizing the stuck status according to claim 1, wherein the position-pose information of the mobile robot in the environmental map contains the current position-pose information of the mobile robot and the position-pose information of a previous node, wherein the real-time monitoring the march information of the mobile robot and according to the position-pose information of the mobile robot in the environmental map predicting whether the mobile robot is stuck or not comprises:
    acquiring current position-pose information of the mobile robot and position-pose information of the previous node, and judging whether the current position-pose information is updated with respect to the position-pose information of the previous node, wherein if yes, a target path which the mobile robot generated at the previous node is acquired, wherein the march information contains a march trajectory which is used for judging whether the mobile robot deviates from the target path.

3. The method for recognizing the stuck status according to claim 2, wherein the real-time monitoring the march information of the mobile robot and according to the position-pose information of the mobile robot in the environmental map predicting whether the mobile robot is stuck or not comprises:
    acquiring deviation time, if the mobile robot deviates from the target path; and
    predicting that the mobile robot is stuck, if the deviation time exceeds a first time threshold.

4. The method for recognizing the stuck status according to claim 1, wherein the data from multiple sensors contains dual main wheel coding values, wherein the recognizing the current stuck status of the mobile robot based on the data from multiple sensors comprises:
    judging whether the dual main wheel coding values are normal or abnormal, when the course angle deviates from the desired angle by a first angle threshold, wherein if normal, the mobile robot is determined as being in a first type of stuck status; and if at least one of the dual main wheel coding values is abnormal, it is determined that a main wheel with an abnormal coding value breaks down, the mobile robot is determined as being in a second type of stuck status.

5. The method for recognizing the stuck status according to claim 4, wherein the method further comprises:
    controlling the mobile robot to execute a first extrication action, if the mobile robot is determined as being in the first type of stuck status;
    controlling the mobile robot to execute a second extrication action, if the mobile robot is determined as being in the second type of stuck status.

6. The method for recognizing the stuck status according to claim 1, wherein the recognizing the current stuck status of the mobile robot based on the data from multiple sensors comprises:
    acquiring the time of abnormal data of the pitch angle and the roll angle and a ground detection strength information, if the pitch angle or the roll angle exceeds a second angle threshold; and
    determining that the mobile robot is in a third type of stuck status, if the time of abnormal data of the pitch angle and/or the roll angle exceeds a second time threshold and the ground detection strength information is attenuated.

7. The method for recognizing the stuck status according to claim 6, wherein the method further comprises:
    controlling the mobile robot to execute a third extrication action, if the mobile robot is determined as being in the third type of stuck status.

8. An apparatus for recognizing a stuck status, wherein the apparatus for recognizing the stuck status comprises a controller and an inertial measurement unit, wherein
    the inertial measurement unit is configured to acquire a march information of the mobile robot and transmit the same to the controller; and the controller is at least configured to monitor the march information of the mobile robot, judge whether the mobile robot is stuck based on data from multiple sensors, and recognize a type of the stuck status, wherein the data from multiple sensors contains current angle information of the mobile robot, the controller ascertains an abnormal angle parameter in the angle information according to a desired angle, and the angle information contains a course angle, a roll angle, and a pitch angle, wherein the apparatus for recognizing the stuck status comprises a main wheel code disk unit and a ground detection sensor, wherein the main wheel code disk unit is configured to acquire main wheel code disk data of the mobile robot and transmit the same to the controller; and the ground detection sensor is configured to acquire information about light reflection strength on a ground and transmit the same to the controller, wherein the controller is configured in such a way that: when the course angle, the roll angle and the pitch angle received by the controller are all smaller than a desired value, and the course angle, the roll angle, and the pitch angle all fluctuate within a preset range, the controller acquires an abnormal time for each of the course angle, the roll angle and the pitch angle, and mobile robot is determined as being in a fourth type of stuck status, if the abnormal time reaches a third time threshold, the controller is also used for controlling the mobile robot to execute a fourth extrication action, if the mobile robot is determined as being in the fourth type of stuck status.

9. The apparatus for recognizing the stuck status according to claim 8, wherein the data from multiple sensors contains dual main wheel coding values, wherein the controller is configured in such a way that: the controller detects whether dual main wheel coding values are normal or abnormal, when the course angle deviates from the desired angle by a first angle threshold, wherein the mobile robot is determined as being in a first type of stuck status, if the dual main wheel coding values are normal; and it is determined that a main wheel with an abnormal coding value breaks down and the mobile is in a second type of stuck status, if at least one of the dual main wheel coding values is abnormal.

10. The apparatus for recognizing the stuck status according to claim 9, wherein the controller is used for controlling the mobile robot to execute a first extrication action, if the mobile robot is determined as being in the first type of stuck status;

the controller is also used for controlling the mobile robot to execute a second extrication action, if the mobile robot is determined as being in the second type of stuck status.

11. The apparatus for recognizing the stuck status according to claim 8, wherein the controller is configured in such a way that: the controller acquires the time of abnormal data of the pitch angle and the roll angle and a ground detection strength information, when the pitch angle or the roll angle exceeds a second angle threshold; and the mobile robot is determined as being in a third type of stuck status, if the time of abnormal data of the pitch angle and/or the roll angle exceeds a second time threshold and the ground detection strength information is attenuated.

12. The apparatus for recognizing the stuck status according to claim 11, wherein the controller is also used for controlling the mobile robot to execute a third extrication action, if the mobile robot is determined as being in the third type of stuck status.

13. A computer storage medium, comprising a processor and a memory, wherein the processor and the memory are in communication connection with each other, and multiple instructions are stored in the memory, and the processor realizes the method of claim 1 for recognizing a stuck status by executing the multiple instructions, the method for recognizing the stuck status comprises: building an environmental map within a preset extent by taking a current position of a mobile robot as center; real-time monitoring a march information of the mobile robot and according to the position-pose information of the mobile robot in the environmental map predicting whether the mobile robot is stuck or not, wherein if yes, data from multiple sensors of the mobile robot is acquired; and recognizing a current stuck status of the mobile robot based on the data from multiple sensors, the march information contains the position-pose information of the mobile robot in the environmental map, wherein the multiple instructions include instructions for controlling the mobile robot when the mobile robot is stuck.

* * * * *